(12) United States Patent
Pogozelits et al.

(10) Patent No.: US 12,413,386 B2
(45) Date of Patent: Sep. 9, 2025

(54) CHAOTIC-BASED ENCRYPTION

(71) Applicant: New Keys Lab Ltd., Herzliya (IL)

(72) Inventors: Gili Simcha Pogozelits, Caesarea (IL); Yossi Avni, Caesarea (IL)

(*) Notice: Subject to any disclaimer, the term of this patent is extended or adjusted under 35 U.S.C. 154(b) by 0 days.

(21) Appl. No.: 18/346,235

(22) Filed: Jul. 2, 2023

(65) Prior Publication Data

US 2024/0204984 A1　　Jun. 20, 2024

Related U.S. Application Data

(60) Provisional application No. 63/476,216, filed on Dec. 20, 2022.

(51) Int. Cl.
*H04L 9/00*　　(2022.01)

(52) U.S. Cl.
CPC .................................... *H04L 9/001* (2013.01)

(58) Field of Classification Search
CPC ......... H04L 9/00; H04L 9/001; H04L 9/0827; H04L 9/0869; H04L 9/0618; H04L 9/085
See application file for complete search history.

(56) References Cited

U.S. PATENT DOCUMENTS

| | | | | |
|---|---|---|---|---|
| 5,680,462 | A * | 10/1997 | Miller | H04L 9/001 380/263 |
| 6,263,146 | B1 * | 7/2001 | Umeno | G06E 3/005 385/47 |
| 6,892,940 | B2 * | 5/2005 | Kocarev | H04L 9/3013 380/263 |
| 8,369,377 | B2 * | 2/2013 | Michaels | H04J 13/0018 375/260 |
| 11,184,147 | B2 * | 11/2021 | Ghorbani | H04L 9/3249 |
| 11,870,884 | B2 * | 1/2024 | Farris | H04L 9/0631 |
| 2007/0050614 | A1 * | 3/2007 | Lin | H04L 9/12 713/150 |

* cited by examiner

*Primary Examiner* — Hosuk Song
(74) *Attorney, Agent, or Firm* — Jose Cherson Weissbrot

(57) ABSTRACT

A method for encrypting a communication session between a plurality of session devices, the method includes providing a common starting point for use by a chaotic state vector random generator in each session device to generate chaotic state vectors, sending to all the session devices a common distance m from the starting point for use by the chaotic state vector random generator in each device to generate a first chaotic state vector $a_m$, updating at all the session devices the common distance m, generating using the chaotic state vector random generator in each device the first chaotic state vector $a_m$, at a sender device, encrypting a plaintext message into ciphertext using the first chaotic state vector $a_m$, and at a receiving device, decrypting the ciphertext message using the first chaotic state vector $a_m$.

14 Claims, 6 Drawing Sheets

CHAOTIC-BASED ENCRYPTION

CROSS-REFERENCE TO RELATED APPLICATIONS

This application claims the benefit of priority from U.S. Provisional Patent Application No. 63/476,216 filed Dec. 20, 2022, the contents of which are incorporated herein by reference in their entirety.

FIELD OF THE INVENTION

The present invention, in some embodiments thereof, relates to encryption implementation methods and, more particularly, but not exclusively, to an implementation method which renders redundant the need to exchange pre-known symmetric keys to encrypt successive messages between two parties. The implemented encryption method is based on using chaotic dynamic generators to produce series of encryption keys.

BACKGROUND OF THE INVENTION

Symmetric-key algorithms are cryptographic algorithms that use the same cryptographic key for both the encryption of data (plaintext) and for the decryption of the encrypted data (ciphertext). The keys may be identical, or there may be a simple transformation between the two keys. The keys, in practice, represent a shared secret between two or more parties that can be used to maintain a private information link. The requirement that both parties have access to the secret key is one of the main drawbacks of symmetric-key encryption (may also be referred to as "symmetric encryption") as it makes it vulnerable to man-in-the-middle (MITM) attacks where a third party steals the secret key. On the other hand, an advantage is that the size of the ciphertext may be smaller than the plaintext.

A newer, more secure alternative to symmetric-key encryption is asymmetric-key encryption (may be also referred to as "asymmetric encryption"). Asymmetric encryption involves the use of two different keys, a first key to encrypt the plaintext and a second different key to decrypt the ciphertext. The two keys are related to each other by a complicated mathematical process making asymmetrical encryption much slower than symmetric encryption and thereby less convenient for use where large amounts of data are required to be transferred. This is further complicated by the fact that the size of the ciphertext is, as a minimum, equal in size to the plaintext, and generally larger in size, contributing to a large communication overhead.

Due to the vulnerability of symmetric encryption to MITM attacks, and due to the large communication overhead imposed by the use of asymmetric encryption, much of the secured communication requiring large amounts of data to be transferred generally combine symmetric encryption with asymmetric encryption. Asymmetric encryption is first used to establish the secure communication. Once established, the communication may continue over the asymmetric connection using symmetric encryption.

SUMMARY OF THE INVENTION

There is provided, in accordance with an embodiment of the present invention, a method for encrypting a communication session between a plurality of session devices, the method includes providing a common starting point for use by a chaotic state vector random generator in each session device to generate chaotic state vectors, sending to all the session devices a common distance m from the starting point for use by the chaotic state vector random generator in each device to generate a first chaotic state vector $a_m$, updating at all the session devices the common distance m, generating using the chaotic state vector random generator in each device the first chaotic state vector $a_m$, at a sender device, encrypting a plaintext message into ciphertext using the first chaotic state vector $a_m$, and at a receiving device, decrypting the ciphertext message using the first chaotic state vector $a_m$.

In some embodiments, the method includes sending the ciphertext to the receiving device using symmetrical encryption.

In some embodiments, the method includes the receiving device sending to all the session devices an increase in distance k from a previous common distance m.

In some embodiments, the method includes updating at all the session devices the increase in distance k.

In some embodiments, the method includes generating using the chaotic state vector random generator in each device a new chaotic state vector $a_{m+k}$.

In some embodiments, the method includes a session device requesting an encryption domain environment and a common starting point.

In some embodiments, the session device receiving an asymmetrical encrypted initial state vector $a_m$ including the encryption domain environment and the common starting point.

In some embodiments, the method includes sending from a server to the session device the symmetrical encrypted initial state vector $a_m$.

In some embodiments, the plurality of session devices includes a blockchain server.

In some embodiments, the plurality of session devices includes IoT devices.

In some embodiments, the chaotic state vector random generators include a Lorentz Attractor.

In some embodiments, the method includes providing a second common starting point for use by the chaotic state vector random generator in each session device to generate backup chaotic state vectors.

In some embodiments, the method includes providing a second common starting point for use by the chaotic state vector random generator in each session device to generate error correction chaotic state vectors.

In some embodiments, wherein the encrypting into ciphertext comprises an XOR operation.

BRIEF DESCRIPTION OF THE DRAWINGS

Some embodiments of the invention are herein described, by way of example only, with reference to the accompanying drawings. Details shown are for exemplary purposes and serve to provide a discussion of embodiments of the invention. The description and the drawings may be apparent to those skilled in the art how embodiments of the invention may be practiced.

DETAILED DESCRIPTION

Figure 1:
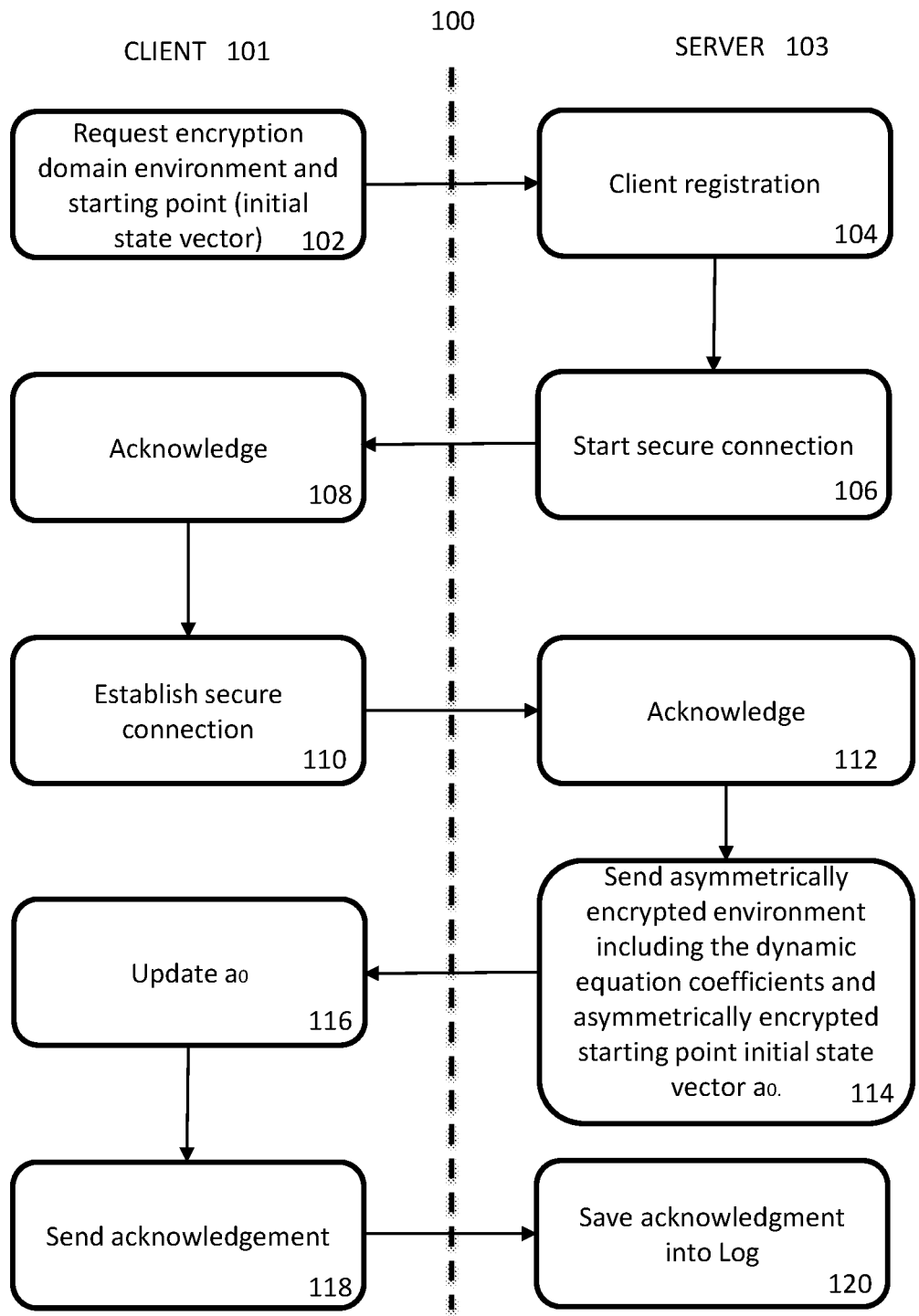
FIG. 1 is a flow chart of an exemplary process of registration and environment initialization prior to starting a chaotic-based encrypted communication session between a client and a server, according to an embodiment of the present invention.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

The applicant has realized that the security level of any symmetric encryption algorithm may be substantially increased by avoiding sharing the generated key over communication channels, and by this, mitigating MITM attacks and eavesdropping vulnerability. Applicant has additionally realized that avoiding sharing a symmetric encryption generated key over an asymmetric encryption connection, as is common practice, may greatly reduce communication overhead and allow for faster transfer of secured data using symmetric encryption.

The present invention relates to a method and a system of encryption based on the use of a chaotic state vector random generator (hereinafter may be referred to as "chaotic generator"), to generate "chaotic" state vectors in a chaotic manner which are predictable only to parties (i.e., clients—senders/receivers, servers) having access to the chaotic generator and to an initial state vector common to all parties which is used to initiate the chaotic generator. The parties agree to increment an index of the chaotic generator at each end after each successful communication data exchange between them. The index may be an under-determined (ill-posed) way to present higher order of information as a sequence of generated chaotic state vectors. Optionally, the agreed index of the chaotic state vectors may be the number of times that the chaotic generator maps the previous chaotic state vector into a new chaotic state vector. A dimension of the output of the chaotic generator may be the same as a dimension of the input chaotic state vector. The dynamic coefficients of an implemented chaotic differential equation adds a degree of freedom by which even knowing the chaotic state vector alone does not allow to predict the sequence of generated chaotic state vectors and therefore the resulting encryption is unpredictable from the outside. This may be of significance as the dynamic coefficients makes it difficult to obtain a copy of a dynamic chaotic process and therefore to synchronize an identical process with an observed process.

A single chaotic state vector generator, or alternatively, multiple chaotic state vector generators, may be used to generate the chaotic state vectors. Examples of such chaotic vector generators may include the simulated triple pendulum, Linear Feedback Shift Register (LFSR), n-dimensional Torus, Arnold's Cat Map, Lorentz Attractor, among other suitable chaotic state vector generators. An example of a chaotic state vector described by the triple pendulum, given three angles and three angular velocities, may be represented by six long double precision numbers, $$a_m = (\theta_1(m), \theta_2(m), \theta_3(m), \dot{\theta}_1(m), \dot{\theta}_2(m), \dot{\theta}_3(m)).$$

Each long double number may be represented by 128 bits. Altogether the state vector $a_m$ may have 768 bits. A different representation may include 3 positions and 3 velocities in (x, y) coordinates. This representation may involve 12 numbers of long double precision and 1536 bits in this two-dimensional case.

The chaotic state vectors may be shared between the parties, as described further on below. The parties may then use symmetric encryption to exchange encrypted messages between them using a generated symmetric encryption key without having to exchange the key. For example, the generated key may be that used for a common symmetrical encryption, the AES256 algorithm, although other known symmetrical encryption keys may be generated. It may be appreciated that the key generator is not limited to symmetric encryptions, and, in some embodiments, may generate unique keys for asymmetric encryption.

In some embodiments, in an initialization process, a common initial state vector do may be exchanged between a client and a server. The initial state vector $a_0$ is shared only at an initialization point, which may be hardcoded or shared over a secured connection, for example, using an asymmetrically encrypted connection. Once the initial state vector $a_0$ has been shared, the client and server may use an identical replica of the chaotic generator to generate a new chaotic state vector from a previous chaotic state vector $a_m \rightarrow a_{m+k}$ by adding a step k. A symmetric key $b_{m+k}=f(a_{m+k})$ may then be generated as an output of a function $f$ and the chaotic state vector $a_{m+k}$ and may eventually be used to derive a symmetric key $b_m=f(a_m)$ as a function of $a_m$, or directly to use $a_m$, as is, to encrypt and decrypt a message. It is noted that the chaotic state vector $a_{m+k}$ may or may not be identical to the output chaotic state vector $b_{m+k}$.

It is noted that, knowing a previous chaotic state vector $a_m$ of the system enables calculating the next chaotic state vector, $a_{m+1}$. However, up to state m+k, all k steps have to be calculated in order to know the next chaotic state vector $a_{m+k}$. The system may remember the last chaotic state vectors $a_{m+1}, a_{m+2}, \ldots, a_{m+k}$ such that if a communication error occurs, it is possible to recover the chaotic state vectors, $a_{m+1}, a_{m+2}, \ldots, a_{m+k}$, from the near past up to k steps backward.

In some embodiments, a tandem operation may be used which includes initialization with two or more initial state vectors, for example, an initial state vector do and an initial state vector $c_0$ which may optionally serve to revive chaotic state vector synchronization after long intervals. These intervals may last as long as days, weeks, months, and years. Optionally, the initial state vector $c_0$ may be used to generate an error correction state vector. The initial state vectors may be exchanged, for example, using asymmetric encryption, optionally RSA, although other encryption protocols may be used. A same chaotic generator may be used by the client and server, or alternatively, two or more chaotic generators may be used. A tandem operation may be particularly advantageous as it provides revival synchronization, added security and more effective recovery in case of communication error.

As an example of an application of a tandem operation, if there is a communication error in step m+k, then $c_0$ may be advanced by the same chaotic generator, or a different chaotic generator, to $c_1$ by both the client and the server. The server may then use $c_1$ and symmetric encryption to encrypt $a_{m+k}$ into ciphertext $g_{m+k}$ and may send $g_{m+k}$ to the client. The client may decrypt $g_{m+k}$ into $a_{m+k}$ and the communication may continue. After the communication error is corrected, the state vector $a_{m+k}$ may then be considered as a new do, that is, a reset state vector. If another communication error occurs, the chaotic generator will advance $c_1$ to $c_2$ and so on. The tandem operation may optionally be extended to a backup key for the c series by initializing an initial state vector $d_0$. In a further example of the use of a backup key for the c series, asymmetric encryption may be used to synchronize the client and the server with $a_0$, $c_0$ and $d_0$. If an error occurs and a report is generated to advance $c_k$ to $c_{k+1}$, then $d_0$ may be advanced to $d_1$ by both the server and the client and $c_{k+1}$ may be sent to the client as a cyphertext $w_{k+1}$. The client may retrieve $c_{k+1}$ which may then be used in the same way to retrieve state vector, say, $a_{n+m}$. It is noted that the tandem operation may work with different depths of backup chaotic generators, and is not limited to a c series and d series as described above.

In some embodiments, the error correction state vector $c_0$ may be hard coded within the chaotic generator. This initialization vector may then be used as a default or for a recovery protocol to resync with a server that manages the chaotic state vectors.

In some embodiments, the method and system of the present invention may be used with Internet-of-Things (IoT) devices and may provide authentication capabilities for symmetric encryption without requiring exchanging of keys, optionally using an internal Blockchain registration server (similar to asymmetric encryption using certification authority). To avoid key-theft (identity-theft), the encryption method may use a blockchain mechanism to manage the registration of each IoT device in the domain and to track its activity, optionally using a rich activities/events logs. The chaotic generator in each device and in the server may generate keys in a specific range which may be used as passwords (tokens) to identify each device that has generated a sequence and/or initiated a connection.

In some embodiments, the keys may be generated using chaotic paths, which may be virtually endless in number. For example, a septillion (trillion of trillions squared, $10^{24 \times 2}$) unique keys may be generated without replication (key collision). It may then be appreciated that all the possible steps may be used for generating keys while the whole keys space may be divided into segments of a unique trillion keys that may be used as passwords (tokens) to verify each registered device. The division of the keys into segments may be done by using different chaotic function dynamic coefficients, e.g., using different 5-dimensional Lorentz Attractor differential equation coefficients. Each registered device may then use its unique key segment to authenticate itself (between communicating parties) while the Blockchain server and the communication endpoints can identify each unique device.

In some embodiments, an additional layer of protection may be provided on registration of new endpoints inside an organization between registered and trusted endpoints and servers. This protection may use a unique key for each device. The key may be used to generate the chaotic generator environment for generating a synchronized set of keys. This unique key may be used once at the initialization stage. It may consider the unique properties of the hardware device, such as, for example, the MAC address. Optionally, part of the generated chaotic generator environment and code may be stored in a hardware protected zone that may not be copied/read/replicated.

It is noted that all registered devices are well-known by the inner system, while the outside world may be easily identified. Only internal endpoints, client and server endpoints, and devices, may decrypt the data using the correct sequence of encryption keys. That is, the inner world is readable from the inside while appearing random from the outside.

It may be appreciated that a distinctive advantage of the method and system of the present invention, over existing encryption methods and systems, is that it enables a much more efficient way of using any available encryption algorithm. It uses a chaotic generator that does not require key exchange between parties. It enables encrypting long messages, images, stream videos, using unique sequences of millions of keys without exchanging a single key.

Figure 6:
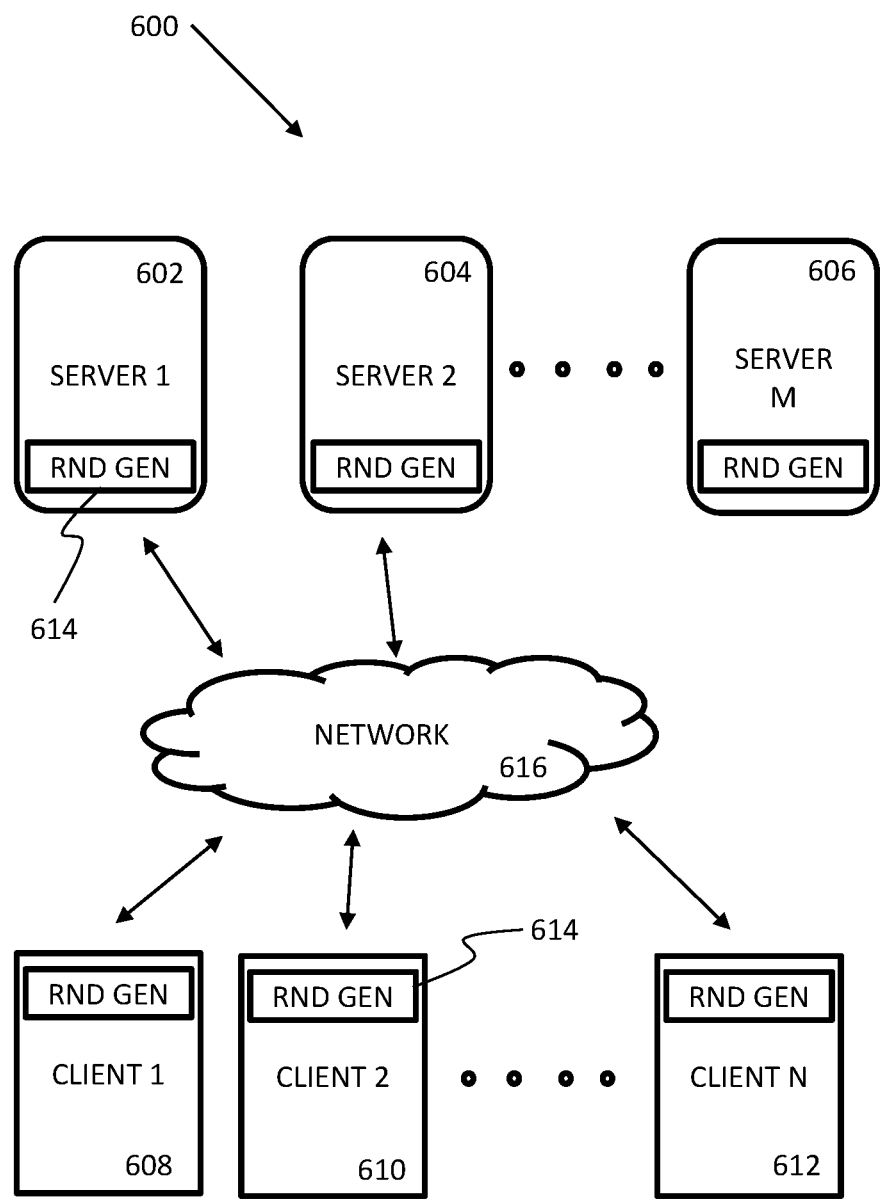
FIG. 6 schematically illustrates an exemplary system for implementing the described method of chaotic-based encryption, according to an embodiment of the present invention.

Reference is now made to FIG. 1 which is a flow chart 100 of an exemplary process of registration and environment initialization prior to starting a chaotic-based encrypted communication session between a client 101 and a server 103, according to an embodiment of the present invention. Client 101 and server 103 are both described further on below with reference to FIG. 6. Additionally described further on below with reference to FIG. 6 is a client 105 (in FIG. 2). It is noted that server 103 may be replaced by another client, for example, client 105.

At block 102, client 101 may contact server 103 and send a request for an encryption domain environment and definition of a starting point. The request may include asymmetric encryption, or alternatively, symmetric encryption.

At block 104, server 103 may authenticate client 101 and performs client registration.

At block 106, server 103 may notify client 101 to start a new secure connection. The notification may include an initialization for asymmetric encryption communication. Alternatively, the initialization may be for symmetric encryption communication.

At block 108, client 101 acknowledges receipt of the notification from server 103.

At block 110, client 101 in response to the notification, may generate a pair of public and private asymmetric keys, denoted PU and PR respectively, using RSA, Elliptic curves, Diffie Hellman or any other asymmetric encryption algorithm and sends the PU to server 103. Alternatively to using asymmetric keys, client 101 may generate symmetric keys.

At block 112, server 103 may acknowledge receipt of the PU from client 101.

At block 114, server 103 in response to the receipt of the PU, may send the encryption domain environment and the starting point to client 101. Server 103 generates a private initial state vector $a_0$, encrypts initial state vector $a_0 \rightarrow g_0$ and sends the encrypted vector to client 101.

The private initial state vector $a_0$ may be sent by server 103 along with the chaotic process dynamic coefficients, e.g., coefficients of a 5-dimensional Lorentz Attractor differential equation, and other environment coefficients. Optionally, more initial state vectors may be sent, for example, initial state vector $a_0$, and a generated second initial state vector $c_0$. The exchange of the initial state vector $a_0$ (and the second initial state vector $c_0$ if generated) may be done using asymmetric encryption for improved security, although, symmetric encryption may be alternatively used. It is noted that the initialization parameters associated with $a_0$ do not have any significant information about the encrypted data to follow.

At block 116, client 101 may use PR to decrypt the initial state vector $a_0$, PR: $g_0 \to a_0$, and updates $a_0$.

At block 118, client 101 may send an acknowledgment to server 103 responsive to updating $a_0$.

At block 120, server 103 may register in its log the acknowledgment received from client 101.

Following the exchange, client 101 and server 103 now share a common private initial state vector $a_0$ (or vectors, e.g., $a_0$, $c_0$) which is not accessible to the external world. After each successful communication, both client 101 and server 103 agree to advance the chaotic state vector by k steps. This may be done by using the chaotic generator which includes a chaotic mapping function M where $M(a_n)=a_{n+1}$ and using the function M, k times, yields M $(M(\ldots(a_m)))=a_{m+k}$. Since M is a chaotic mapping function, a small difference in the previous state $a_m$, may result in a large difference in the next state $a_{m+k}$, generally with a positive Lyapunov exponential coefficient. This property of the chaotic mapping function M makes it difficult to predict without calculating all the k new steps.

Figure 2:
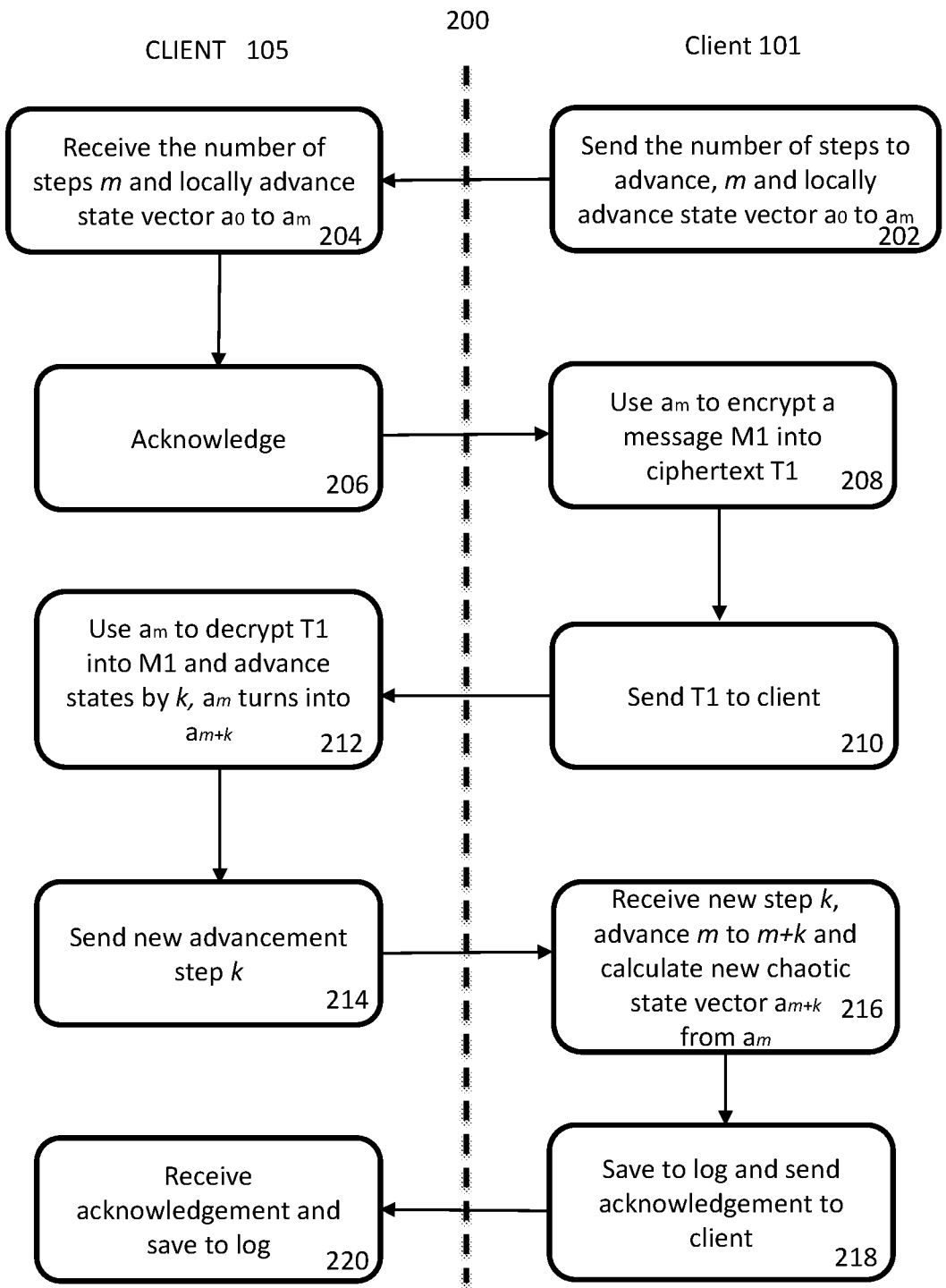
FIG. 2 is a flow chart of an exemplary chaotic-base encrypted communication session between a client receiving an encrypted message from another client, according to an embodiment of the present invention.

Reference is now made to FIG. 2 which is a flow chart 200 of an exemplary chaotic-base encrypted communication session between client 105 receiving an encrypted message from client 101, according to an embodiment of the present invention. It is noted that, although flow chart 200 is described with reference to client 105 being a receiver (client 101 is the sender), it should also be apparent that the roles of client 101 and client 105 may be interchanged one or more times during a communications session, that is, the clients may both act as senders and receivers. It is further noted that any one of the clients, or both clients, may be replaced by servers.

At block 202, client 101 may send client 105 the number of steps m to locally advance the initial state vector $a_0$ to generate a chaotic state vector $a_m$.

At block 204, client 105 may receive the number of steps m and locally may advance the initial state vector $a_0$ to generate chaotic state vector $a_m$. At client 105, chaotic generator chaotic mapping function M is given by $M(M(\ldots(a_0)))=a_m$ where m is the number of steps advanced responsive to the message received from client 101.

At block 206, client 105 may send client 101 an acknowledgement of the advancement.

At block 208, client 101 may encrypt a message M1 (message $M_m$ m=1) into ciphertext T1 (ciphertext $T_m$ with m=1) by using chaotic state vector $a_m$ and optionally, symmetrical encryption. The encryption may be optionally done by an XOR operation between the chaotic state vector $a_m$ and the message $M_m$ to be encrypted, described by the equation $T_m=M_m$ XOR $a_m$, or between the message $M_m$ and a function of the chaotic state vector $f(a_m)$, described by the equation $T_m=M_m$ XOR $f(a_m)$. If the message $M_m$ is much longer than the chaotic state vector $a_m$, the message may be broken down into smaller messages. This may optionally be done in order to make it harder for an attacker to decipher the message $M_m$.

At block 210, client 101 may send the ciphertext T1 to client 105.

At block 212, client 105 may use chaotic state vector $a_m$ and symmetrical decryption to decrypt T1 back into the original message M1. Client 105 may additionally advance the states by a random number of steps k so that chaotic state vector $a_m$ is updated into $a_{m+k}$. Client 105 may arbitrarily choose the number of steps by which to advance k, optionally a relatively small number of steps, for example, 1000 steps or less, 800 steps or less, 500 steps or less, 300 steps or less, 200 steps or less, 100 steps or less, 50 steps or less, or 20 steps or less.

At block 214, client 105 may send the new step k to client 101. Optionally, in order to increase security, k is encrypted by using the chaotic state vector $a_m$.

At block 216, client 101 may receive the new step k and may decrypt the optionally encrypted k by using the chaotic state vector $a_m$. Once decrypted, client 101 may advance m to m+k and may calculate an updated chaotic state vector $a_{m+k}$ from chaotic state vector $a_m$.

At block 218, client 101 may save to log the updated chaotic state vector $a_{m+k}$ and may send an acknowledgement of the update to client 105.

At block 220, client 105 receives the acknowledgement from client 101 and saves it to its log.

The skilled person may clearly appreciate that blocks 208-220 may be executed in the inverse direction with client 105 acting as the sender of the message $M_m$ and client 101 acting as the receiver of the ciphertext $T_m$. That is blocks 208, 210, 216, and 218 may be executed by client 205 and blocks 212, 214, and 220 may be executed by client 101. It is noted that, to ensure maximum security, k may be sent encrypted by the sender of $T_m$ using $a_m$, and that $a_m$ is then used by the receiver to decrypt k. It is additionally noted that the receiver of the ciphertext $T_m$ decides by how many steps k to advance the chaotic state vector $a_m \to a_{m+k}$, that is, whoever initiates sending an encrypted message, after the message is received and decrypted, the chaotic state vector $a_m$ is advanced into $a_{m+k}$ by the receiver.

It is further noted that, after each time the ciphertext $T_m$ is received, both client 105 and client 101 may advance the chaotic state vector. Optionally, client 101 and client 105 may also advance the chaotic state vector $a_m \to a_{m+k}$ by the same number of random steps k.

Figure 3:
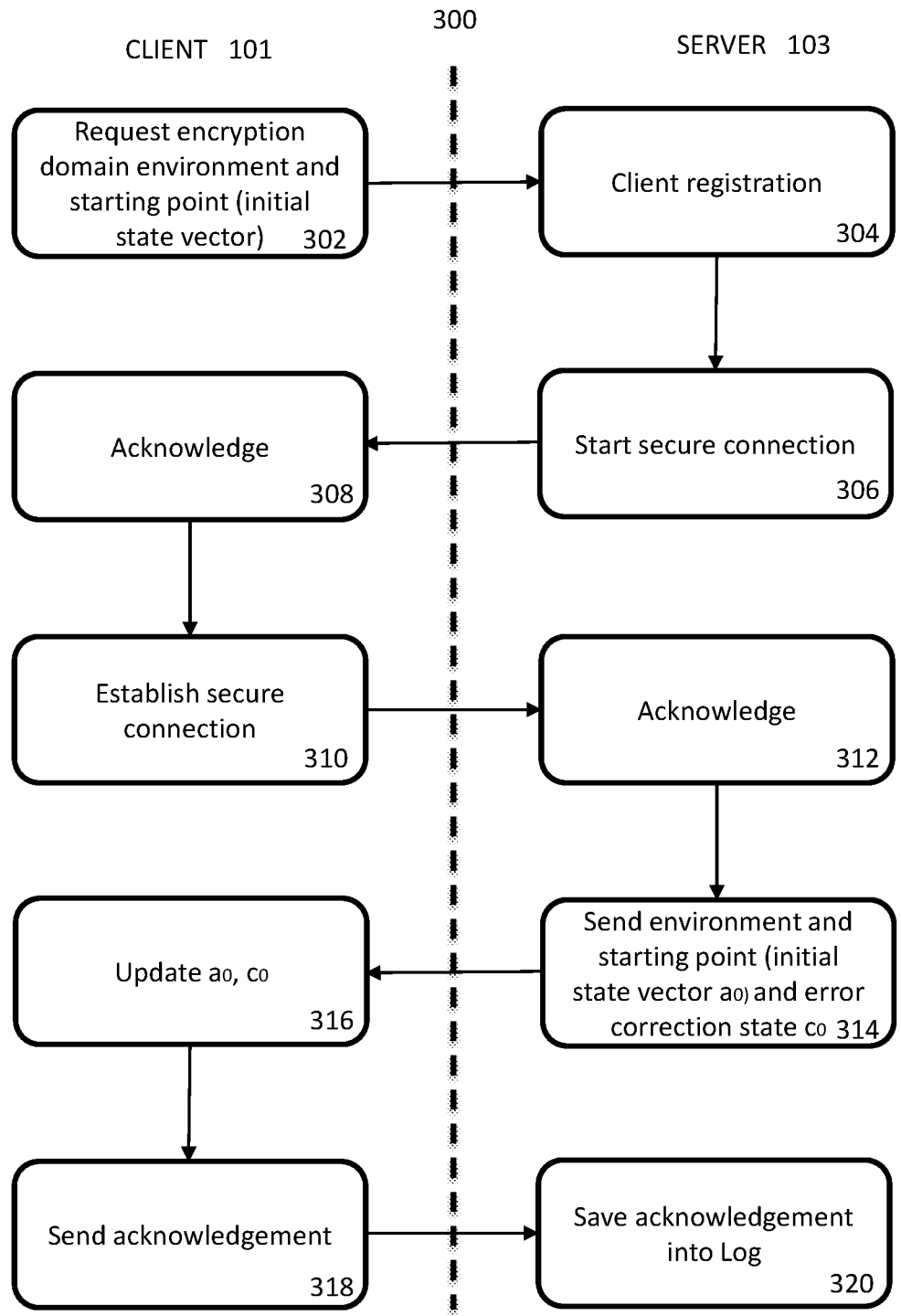
FIG. 3 is a flow chart of an exemplary method of revival of chaotic state vector synchronization between a client and a server after a long inactive interval by the client, according to an embodiment of the present invention.

Reference is now also made to FIG. 3 which is a flow chart 300 of an exemplary method of revival of chaotic state vector synchronization between client 101 and server 103 after a long inactive interval by the client, according to an embodiment of the present invention. Optionally, a long active interval may include a plurality of minutes, hours, days, weeks, months, and/or years. Optionally, a chaotic state vector used for the synchronization may be used as an error correction state vector which may serve to compensate for communication errors, as described further on below with reference to FIG. 4. It is noted that server 103 may be replaced by client 105.

At block 302, client 101 may contact server 103 and send a request for an encryption domain environment and definition of a starting point. The request may include asymmetric encryption, or alternatively, symmetric encryption.

At block 304, server 103 may authenticate client 101 and performs client registration.

At block 306, server 103 may notify client 101 to start a new secure connection. The notification may include an initialization for asymmetric encryption communication. Alternatively, the initialization may be for symmetric encryption communication.

At block 308, client 101 acknowledges receipt of the notification from server 103.

At block 310, client 101 in response to the notification, may generate a pair of public and private asymmetric keys, denoted PU and PR respectively, using RSA, Elliptic curves, Diffie Hellman or any other asymmetric encryption algorithm and sends the PU to server 103. Alternatively to using asymmetric keys, client 101 may generate symmetric keys.

At block 312, server 103 may acknowledge receipt of the PU from client 101.

At block 314, server 103 in response to the receipt of the PU, may send the encryption domain environment and the starting point to client 101. Server 103 generates a private initial state vector $a_0$, and an initial state vector $c_0$ for error correction. Server 103 asymmetrically may encrypt initial state vector $a_0 \rightarrow g_0$ and an initial error correction vector $c_0 \rightarrow h_0$ and send the encrypted initial state vectors to client 101. The private initial state vector $a_0$ and the initial error correction vector $c_0$ may be sent by server 103 along with the chaotic process dynamic coefficients, e.g., coefficients of a 5-dimensional Lorentz Attractor differential equation, and the environment coefficients.

At block 316, client 101 may use PR to decrypt the initial state vector $a_0$, PR: $g_0 \rightarrow a_0$, $h_0 \rightarrow c_0$ and updates $a_0$, $c_0$.

At block 318, client 101 may send an acknowledgment to server 103 responsive to updating $a_0$.

At block 320, server 103 may register in its log the acknowledgment received from client 101.

Figure 4:
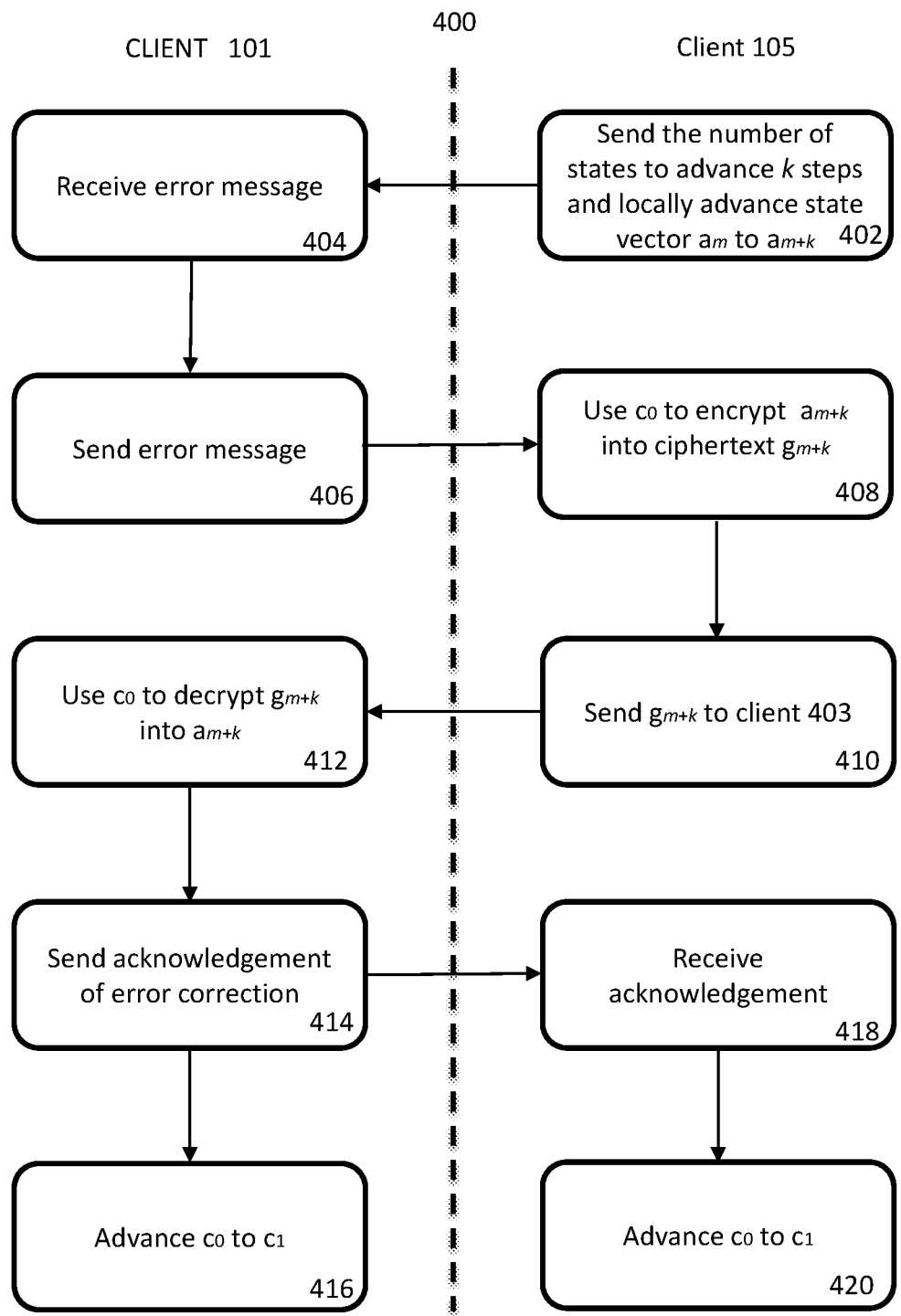
FIG. 4 is a flow chart of an exemplary method of chaotic-based encryption including the use of an error correction state vector to compensate for a chaotic state vector updating error between a client and another client, according to an embodiment of the present invention.

Reference is now made to FIG. 4 which is a flow chart 400 of an exemplary method of chaotic-based encryption including the use of an error correction state vector to compensate for a chaotic state vector updating error between client 101 and client 105, according to an embodiment of the present invention. In flow chart 400, the error correction is described with reference to an imaginary scenario between two clients, for example client 101 and second client 105, where the second client receives a ciphertext from the first client and following advancing k and locally updating $a_{m+k}$, when sending the updated k to the first client, a communication error occurs. The exemplary method includes use of the error correction state vector $c_0$ described in FIG. 3 with reference to flowchart 300 to perform the compensation and correct for an updating error in $a_{m+k}$.

At block 402, client 105 may use $a_m$ and symmetrical decryption to decrypt the ciphertext received from client 101. Client 105 locally advances the chaotic state vector by a random number of steps k so that chaotic state vector $a_m$ is updated into $a_{m+k}$. Client 105 then sends the new step k to client 101. Optionally, in order to increase security, k is encrypted by using the chaotic state vector $a_m$.

At block 404, following a communication error, client 101 does not receive an updated new step k and therefore does not update the chaotic state vector $a_m$ into chaotic state vector $a_{m+k}$. Client 101 additionally does not send an acknowledgement to client 105.

At block 406, following not sending an acknowledgement, client 101 sends an error message to client 105.

At block 408, client 105 receives the error message, and in response, encrypts the entire chaotic state vector $a_{m+k}$ into ciphertext $g_{m+k}$ by using the additional state vector $c_0$.

At block 410, client 105 sends ciphertext $g_{m+k}$ to client 101.

At block 412, client 101 decrypts $g_{m+k}$ into $a_{m+k}$ using the additional state vector $c_0$. It is noted that both client 105 and client 101 have the additional state vector $c_0$ (as previously described with reference to flowchart 300).

At block 414, client 101 sends an acknowledgement of error correction to client 105.

At block 416, client 101 locally updates $c_0$ to $c_1$ and also has the last updated chaotic state vector $a_{m+k}$.

At block 418, client 105 receives the acknowledgement of the error correction from client 101.

At block 420, client 105 locally updates $c_0$ to $c_1$ and also has the last updated chaotic state vector $a_{m+k}$, so that both client 105 and client 101 now share the same chaotic state vector $c_1$ and chaotic state vector $a_{m+k}$.

It is noted that the last known $a_m$ may be used by client 105 to encrypt k and resend it to client 101. Nevertheless, this option may be less efficient and very time consuming, especially if the two clients are part of a larger group and only the communication between client 105 and client 101 may have been lost. This may be due to the function M being chaotic and the use of the iterative function $a_{m+k} = M(M(M( \ldots f(a_m))))$ many times on the vector $a_m$ which was the last valid chaotic state vector that client 101 had.

Figure 5:
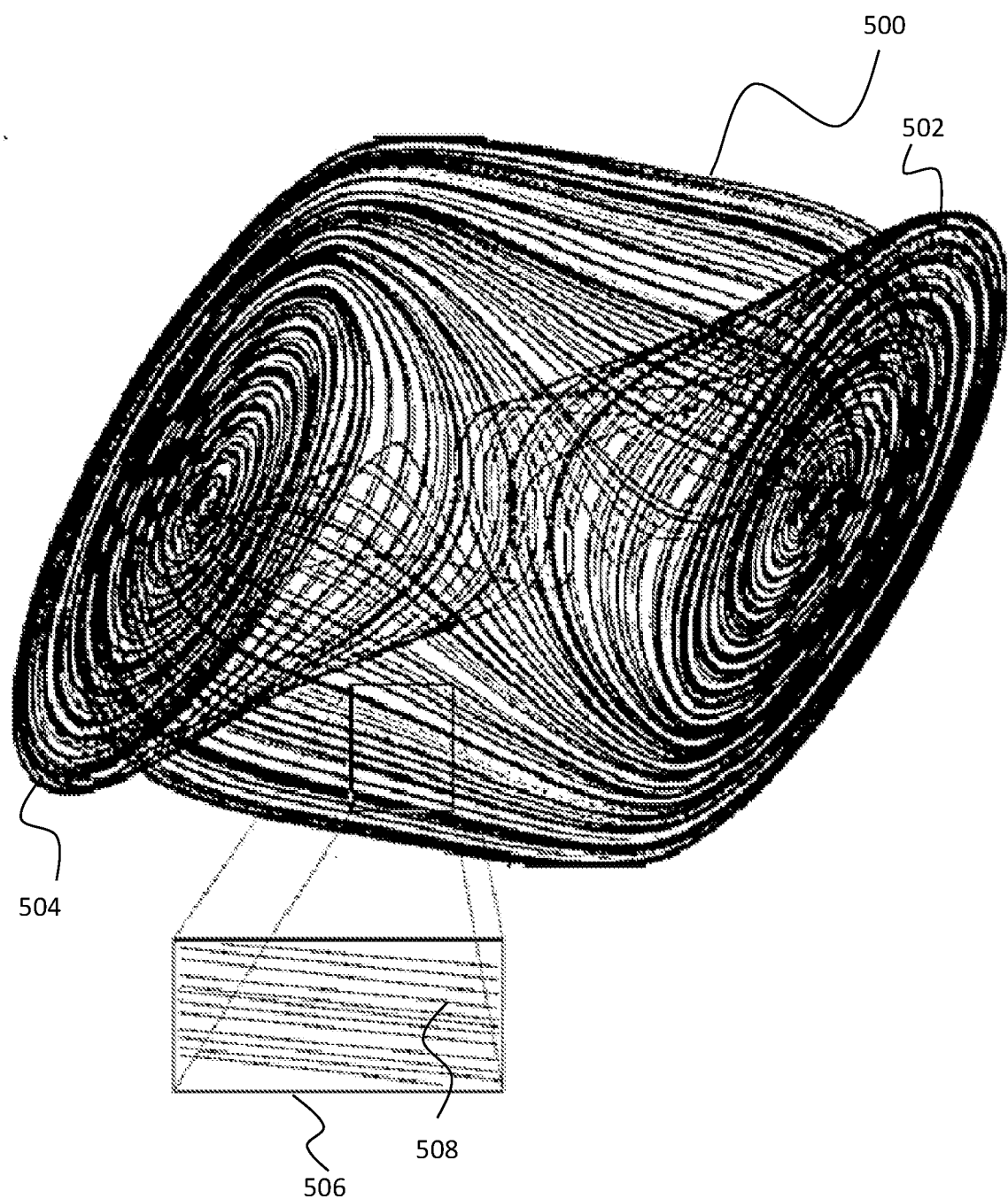
FIG. 5 schematically illustrates an exemplary segmentation of generated orbits per device base on the Lorenz attractor, according to an embodiment of the present invention.

As previously mentioned, a single chaotic state random vector generator, or alternatively, multiple chaotic state vector random generators, may be used to generate the chaotic state vectors. Examples of such chaotic vector random generators may include the simulated triple pendulum, Linear Feedback Shift Register (LFSR), n-dimensional Torus, Arnold's Cat Map, Lorentz Attractor, among other suitable chaotic state vector generators. FIG. 5 schematically illustrates an exemplary segmentation of generated orbits per device base on the Lorenz attractor 500, according to an embodiment of the present invention. Shown therein is the attractor 500 weaving back and forth between a first end 502 and a second end 504. A detailed view 506 shows a group of segments, each segment 508 may be used for generating the chaotic state vectors for use in authenticating parties which exchange encrypted data using symmetric encryption using the chaotic-based encryption method described. Each different segment may be associated with small modifications in the chaotic differential equations. For example, in one orbit one may use, sigma1=value1, sigma2=value2, rho=value3, beta=value4 and in the other, for example, sigma1=value1+0.01, sigma2=value2−0.01, rho=value3−0.03, beta=value4. Different orbits/sectors of key sequences may be generated by applying the differences to the following equations:

$$\frac{dx}{dt} = \text{sigma1} * (y - x)$$

$$\frac{dz}{dt} = \text{sigma2} * (s - z)$$

$$\frac{dy}{dt} = x * (rho - z) - y$$

$$\frac{dw}{dt} = z * (rho - x) - w$$

$$\frac{ds}{dt} = (x - rho) * y - \text{beta} * s$$

Reference is now made to FIG. 6 which schematically illustrates an exemplary system 600 for implementing the described method of chaotic-based encryption, according to an embodiment of the present invention. System 600 may include one or more servers, for example, a SERVER 1 602, SERVER 2 604, through SERVER M 606; one or more clients, for example CLIENT 1 608, CLIENT 2 610, through CLIENT N 612; and one or more communications network 616.

SERVER 1 602, SERVER 2 604, through SERVER M 606 may include any one of, or any combination of, a dedicated server, a distributed server, a cloud-based server, a blockchain server, among other servers suitable to execute the method of the present invention. SERVER 1 602, SERVER 2 604, through SERVER M 606, may be configured to execute, but not be limited to, execute the operations associated with server 103 identified in the flowcharts of FIGS. 1-4. SERVER 1 602, SERVER 2 604, through SERVER M 606 each may include a same chaotic state vector random generator RND GEN 614 as required to implement the method in a same chaotic-encrypted communications session.

CLIENT 1 608, CLIENT 2 610, through CLIENT N 610 may include any one of, or any combination of, devices suitable to execute the method of the present invention. CLIENT 1 608, CLIENT 2 610, through CLIENT N 610, may be configured to execute, but not be limited to, execute the operations associated with client 101 and/or client 105 identified in the flowcharts of FIGS. 1-4. CLIENT 1 608, CLIENT 2 610, through CLIENT N 610 each may include a same chaotic state vector random generator RND GEN 614 as required to implement the method in a same chaotic-encrypted communications session, and which may be the same chaotic state vector random generator as in SERVER 1 602, SERVER 2 604, through SERVER M 606.

CLIENT 1 608, CLIENT 2 610, through CLIENT N 610 may include mobile and stationary computing devices such as PCs, laptop computers, tablets, smartphones, smart watches, and smart glasses, among other suitable computing devices suitable to implement the method. CLIENT 1 608, CLIENT 2 610, through CLIENT N 610 may additionally include IoT devices which may include mobile and/or stationary devices.

Communications network 616 may include a wireless communication network and/or wired communication network suitable to implement the method of the present invention. Communications network 616 may include a private network, a public network, a distributed network, among others. The wireless communications network may include a wireless LAN (local area network), a wireless MAN (metropolitan area network), a wireless PAN (personal area network), a wireless WAN, and/or satellite communications. The wired communications network may include a cable network, a telephone network, and/or a fiber optics network, Unless specifically stated otherwise, as apparent from the preceding discussions, it is appreciated that, throughout the specification, discussions utilizing terms such as "processing." "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The invention claimed is:

1. A method for encrypting a communication session between a plurality of session devices, the method comprising:
providing a common starting point for use by a chaotic state vector random generator in each session device to generate chaotic state vectors;
sending to the plurality of session devices a common distance m from the common starting point for use by the chaotic state vector random generator in each session device to generate a first chaotic state vector $a_m$;
updating at the plurality of session devices the common distance m;
generating using the chaotic state vector random generator in each session device the first chaotic state vector $a_m$;
at a sender device, encrypting a plaintext message into ciphertext using the first chaotic state vector $a_m$; and
at a receiving device, decrypting the ciphertext message using the first chaotic state vector $a_m$.

2. The method of claim 1 comprising sending the ciphertext to the receiving device using symmetrical encryption.

3. The method of claim 1 comprising the receiving device sending to the plurality of session devices an increase in distance k from a previous common distance m.

4. The method of claim 3 comprising updating at the plurality of session devices the increase in distance k.

5. The method of claim 4 comprising generating using the chaotic state vector random generator in each session device a new chaotic state vector $a_{m+k}$.

6. The method of claim 1 further comprising a session device requesting an encryption domain environment and a common starting point.

7. The method of claim 6 further comprising the session device receiving an asymmetrical encrypted initial state vector $a_m$ comprising the encryption domain environment and the common starting point.

8. The method of claim 6 further comprising sending from a server to the session device the symmetrical encrypted initial state vector $a_m$.

9. The method of claim 1 wherein the plurality of session devices comprises a blockchain server.

10. The method of claim 1 wherein the plurality of session devices comprises IoT devices.

11. The method of claim 1 wherein the chaotic state vector random generators comprise a Lorentz Attractor.

12. The method of claim 1 further comprising providing a second common starting point for use by the chaotic state vector random generator in each session device to generate backup chaotic state vectors.

13. The method of claim 1 further comprising providing a second common starting point for use by the chaotic state vector random generator in each session device to generate error correction chaotic state vectors.

14. The method according to claim 1 wherein the encrypting into ciphertext comprises an XOR operation.

* * * * *